US008951005B2

(12) United States Patent
Smeulers

(10) Patent No.: US 8,951,005 B2
(45) Date of Patent: Feb. 10, 2015

(54) TURBO MACHINE AND METHOD TO REDUCE VIBRATION IN TURBO MACHINES

(75) Inventor: Johannes Petrus Maria Smeulers, Zwijndrecht (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 877 days.

(21) Appl. No.: 13/126,732

(22) PCT Filed: Oct. 27, 2009

(86) PCT No.: PCT/NL2009/050647
§ 371 (c)(1),
(2), (4) Date: Jul. 5, 2011

(87) PCT Pub. No.: WO2010/050805
PCT Pub. Date: May 6, 2010

(65) Prior Publication Data
US 2011/0255953 A1 Oct. 20, 2011

(30) Foreign Application Priority Data
Oct. 28, 2008 (EP) .................................. 08167727

(51) Int. Cl.
F04D 29/66 (2006.01)
F04D 29/44 (2006.01)
(Continued)

(52) U.S. Cl.
CPC ............ F04D 26/665 (2013.01); F04D 29/422 (2013.01); F04D 29/428 (2013.01); F04D 29/669 (2013.01); F04D 29/681 (2013.01); F16L 55/02727 (2013.01)

USPC ......... 415/119; 415/204; 415/206; 415/211.2

(58) Field of Classification Search
CPC ... F04D 29/422; F04D 29/428; F04D 29/661; F04D 29/663; F04D 29/665; F04D 29/669
USPC ................ 415/1, 119, 204, 206, 211.1, 211.2
See application file for complete search history.

(56) References Cited

U.S. PATENT DOCUMENTS 3,034,702 A * 5/1962 Larsson et al. .................. 415/97
4,869,644 A * 9/1989 Takigawa ...................... 416/235
(Continued)

FOREIGN PATENT DOCUMENTS

CH 278711 A 10/1951
DE 19538178 C1 3/1997
(Continued)

OTHER PUBLICATIONS

Extended European Search Report mailed Jun. 30, 2009, from European Application No. 08167727.0 (5 pages).
(Continued)

Primary Examiner — Edward Look
Assistant Examiner — Jason Davis
(74) Attorney, Agent, or Firm — Kilpatrick Townsend & Stockton LLP

(57) ABSTRACT

A turbo machine (1) comprises a casing (2) and a first volute tongue (12), an impeller (3) with at least one vane (4), and a flow splitter plate (5) comprising a second volute tongue (13) for splitting a flow of a fluidic medium produced by the impeller. The flow splitter plate comprises at least one opening (10) connecting the first surface (8) and the second, opposite surface (9) so as to reduce or eliminate vibrations.

14 Claims, 3 Drawing Sheets

(51) Int. Cl.
*F04D 29/42* (2006.01)
*F04D 29/68* (2006.01)
*F16L 55/027* (2006.01)

(56) References Cited

U.S. PATENT DOCUMENTS

| | | | |
|---|---|---|---|
| 5,286,162 A | | 2/1994 | Veres |
| 5,399,064 A | * | 3/1995 | Church et al. .............. 415/58.3 |
| 5,536,140 A | * | 7/1996 | Wagner et al. ................ 415/119 |
| 5,603,607 A | * | 2/1997 | Kondo et al. ................. 416/228 |
| 6,039,532 A | * | 3/2000 | McConnell .................. 415/119 |

FOREIGN PATENT DOCUMENTS

| | | |
|---|---|---|
| DE | 19823575 A1 | 12/1999 |
| EP | 1378668 A1 | 1/2004 |
| GB | 2361050 A | 10/2001 |
| GB | 2416003 A | 1/2006 |

OTHER PUBLICATIONS

International Search Report mailed Apr. 26, 2010, from PCT Application No. PCT/NL2009/050647 (3 pages).
International Preliminary Report on Patentability mailed May 3, 2011, from PCT Application No. PCT/NL2009/050647 (5 pages).

* cited by examiner

TURBO MACHINE AND METHOD TO REDUCE VIBRATION IN TURBO MACHINES

CROSS-REFERENCES TO RELATED APPLICATIONS

This application is a National Stage of International Application No. PCT/NL2009/050647, filed Oct. 27, 2009, and which claims the benefit of European Patent Application No. 08167727.0, filed Oct. 28, 2008, the disclosures of which are incorporated herein by reference.

The present invention relates to a turbo machine and a method to reduce vibrations in turbo machines.

More in particular the present invention relates to a turbo machine comprising a first volute tongue and a flow splitter plate comprising a second volute tongue and to a method to reduce vibrations in such turbo machines.

STATE OF THE ART

Turbo machines like pumps, compressors, and turbines show high noise and vibration levels at normal operation conditions. The noise is bothersome and sometimes even harmful for humans, whereas the vibrations may endanger the reliability and safe operation of these machines. The vibrations induced by the pump, compressor or turbine might even endanger the integrity of an installation containing such a machine. Periodic movements and pressure fluctuations may result in oscillations or pulsations with large amplitudes when the frequency of the periodic movement or pulsation coincides with a resonance frequency of a structural part of the machine or the installation, for instance a pipe system, attached to the machine.

For centrifugal pumps and compressors a dominant source of pulsations can usually be found in the interaction between the rotating parts of the machine and static parts, in particular in the volute, viz. the area between the rotating vanes and the inner surface of the casing. In centrifugal pumps the source of pulsations often can be found in the interaction between the rotating impeller vanes on one side and the casing or more in particular a static volute tongue, being a flow dividing edge, on the other side. Such vibrations or pulsations might be enhanced by resonances within the fluidic medium (liquid, gas or vapour) that is transported or compressed by the turbo machine. Double-volute centrifugal pumps like the one disclosed in UK patent application GB2416003A comprise a casing and a first volute tongue, an impeller with at least one vane, and a flow splitter plate comprising a second volute tongue for splitting a flow of a fluidic medium produced by the impeller, the flow splitter plate having a first surface and a second, opposite surface.

The flow splitter plate or partition wall decreases or even eliminates radial forces on the impeller that might occur in single-volute pumps due to an unbalanced flow of the fluidic medium. For this reason double-volute pumps are often preferred, in particular when a large operation window is desired.

It is acknowledged that noise in pumps and compressors often originates from the flow interaction between the impeller and the stator or volute tongue. An overview of noise mechanisms within centrifugal pumps can for instance be found in G. Rzentkowski, *Generation and control of pressure pulsations emitted from centrifugal pumps: a review*, ASME publication PVP, volume 328, Flow-Induced Vibration (1996), pp. 439-454. It is appreciated by those skilled in the art that the resonance can be suppressed or avoided by specific geometrical constructions and by operating the pump in a well-defined operating window. So optimization of blade geometry, number of blades, the rotation frequency, the radial gap between impeller and diffuser or volute tongue, and diameter of the pump discharge may suppress or mitigate the generation of pulsations at given operating conditions. See e.g. H. Zogg and U. Bolleter, *Generation and propagation of hydraulic noise in centrifugal pumps*, in Proceedings of the 1st International symposium on Pumps Noise and Vibration in Clamart, France (1993) pp. 263-270. The problem with such a specific design of the pump is that it results in a very narrow operating window of the pump because certain operating conditions have to be avoided. A deviation from the ideal parameters of the medium, like e.g. the velocity of sound due to temperature variation, speed, and flow may result in vibrations. Another, related problem is that the specific operating conditions, including the properties of the medium that has to be pumped, are in particular circumstances not known in such detail that the pump can be designed in a way that no resonance conditions occur during use. Another problem is that a turbo machine designed for a specific application is no longer of use if one chooses to change the operation conditions. Once installed it is hardly feasible to modify the pump at acceptable costs. These problems hold for all types of turbo machines, with either an axial or a centrifugal geometry.

German patent DE 19538178C1 discloses a method to dampen acoustic noise and pressure pulses in pipe systems comprising a pump or compressor. This publication shows a perforated plate or orifice that is placed in a pipe, perpendicularly to the flow direction of the fluidic medium. The problem of this method for reducing the noise or pulsations is that such a plate causes additional pressure loss and thus reduces efficiency.

EP 1 378 668 discloses a single volute turbo machine comprising a stabilizer element. Essentially, this stabilizer element is a plate comprising holes. The function of this stabilizer element is to homogenize the flow. The stabilizer element is situated essentially perpendicular to the direction of the main flow.

SUMMARY OF THE INVENTION

It is an objective of the present invention to provide a turbo machine that is not prone to resonances. This objective of the invention is obtained by a flow splitter plate comprising at least one opening connecting the first surface and the second, opposite surface. The effect of an opening in the flow splitter plate is that such an opening dampens the resonance of the medium and the plate if there is a pressure drop across the opening. Such a pressure drop occurs when the medium at the two opposite surfaces of the flow splitter plate pulsates out of phase. The advantage over placing an orifice in the discharge is that the flow of the medium is not hindered and there is no additional pressure loss.

It is another objective of the present invention to provide a pipe system comprising a pump or compressor that is not prone to resonances. This objective of the invention is obtained by a pump or compressor that is a turbo machine according to the invention.

The effect of using the turbo machine according to the invention is that it generates less or no pulsations that could propagate through the pipe system and that dynamic forces on the internals of the pipe system are smaller. Here holds the same advantage as mentioned above; as there is no obstruction in the flow, no or fractional additional pressure loss is introduced.

The present disclosure also provides a method to reduce vibrations in turbo machines having a casing, a first volute tongue, an impeller with at least one vane, and a flow splitter plate with a second volute tongue for splitting a flow of a fluidic medium produced by the impeller, the method comprising:

providing openings in the flow splitter plate; and
diminishing pressure differences at the two sides of the splitter plate by means of the openings.

U.S. Pat. No. 5,286,162 discloses a method to reduce hydraulic instability in centrifugal pumps and compressors that do not comprise a flow splitter plate. This method comprises making holes in the one and only volute tongue, being part of the casing of such a single-volute turbo machine. These openings in the volute tongue allow the fluid to flow from one surface of the tongue to the other when the fluid flow from the impeller impinges the volute tongue at an angle due to a non-optimal operation of such a turbo machine. In centrifugal pumps or compressors without such openings the pressure difference caused by the non-parallel flow is maintained and flow separation occurs with the consequence of a reduced over-all efficiency of the pump or compressor. In particular such pumps and processors are mentioned to be prone to stall. So, this method allows in general operation of single volute pumps and compressors in a wider operation window with high efficiency than those without such openings, but the problem of pulsations is not necessarily solved. In addition this turbo machine suffers from the disadvantages of a single-volute pump.

The stabilizing element that is disclosed in EP-1 378 668 does not split the flow into distinct channels as is the case in double volute pump as disclosed in this application. The splitter plane in which the splitter plate extends is situated essentially parallel to the direction of the main flow. The main function of a splitter plate is that it decreases or eliminates radial forces on the impeller by splitting the flow into two channels. The difference in function between the stabilizing element of EP-1 378 668 and the splitter plate as disclosed in the present application is expressed in the position of the stabilizer element and the splitter plate. Thus, the known stabilizer element and the novel splitter plate have undeniable a different construction and a different function.

DETAILED DESCRIPTION THE FIGURES

Figure 1:
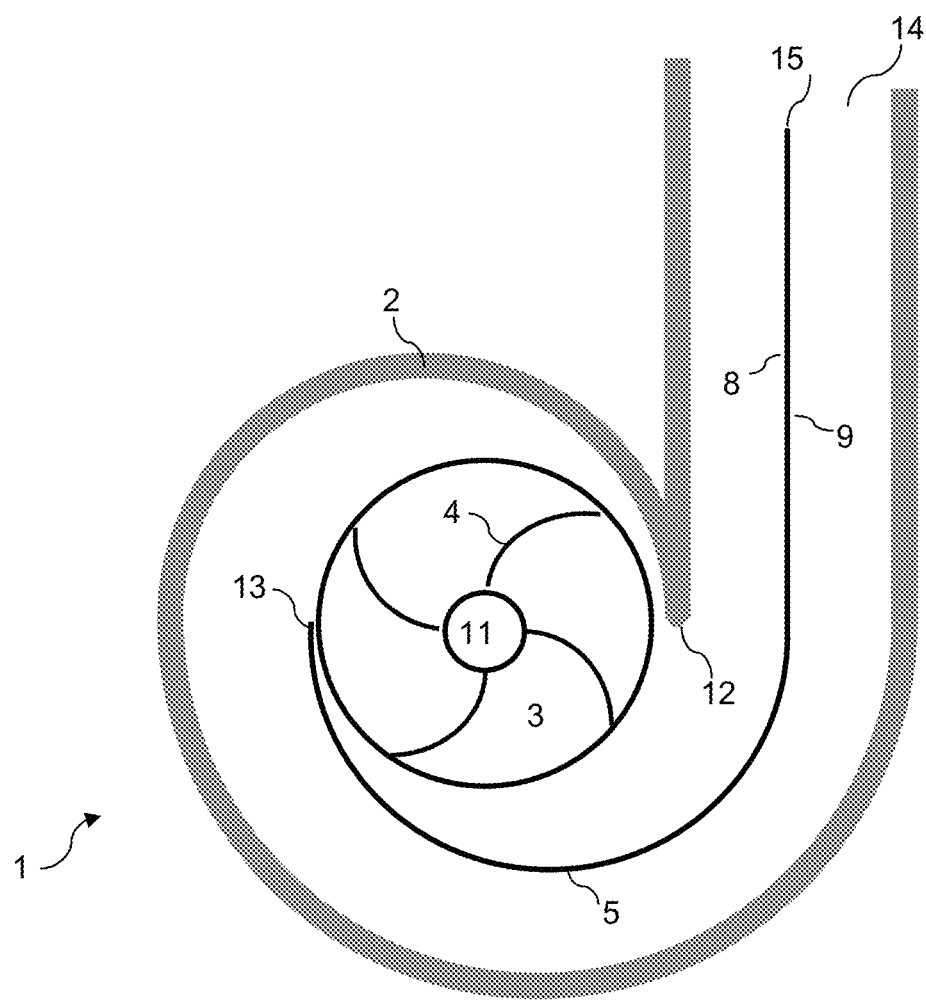
FIG. 1 shows a double-volute centrifugal pump according to the state of the art in a cross-sectional view.

FIG. 1 shows a double-volute centrifugal pump according to the state of the art. The fluidic medium enters the pump from the inlet eye 11 the centre of the rotating impeller 3. The rotating vanes 4 impart energy to the medium that leaves the pump casing 2 at the discharge 14. The flow splitter plate 5 creates the double-volute by dividing the volute of the pump into two volute regions; one at the side of the first surface 8 of the flow splitter plate and a second volute region at the second, opposite side 9 of the flow splitter plate.

In single stage, double-volute turbo pumps, i.e. for pumping propane in an energy conversion plant, standing wave resonance can occur at certain process conditions. Such a resonance can be excited by pulsations resulting from an interaction of the impeller vanes 4 and the two volute tongues of the pump, viz. the volute tongue 12 of the casing and the volute tongue 13 of the flow splitter plate. It is well known that pulsations can be suppressed by an orifice placed perpendicular to the flow. However, it has surprisingly been found that also openings in a flow splitter plate that is placed in the volute or discharge of the pump in parallel with the flow, can suppress such resonances or dampen the building-up of the resonances. The openings might consist of one through hole or a series of holes forming a perforated area. The openings in the flow splitter plate remove the need to install an orifice or other damping object perpendicular to the flow. As a consequence, the flow resistance for the fluidic medium within the turbo machine is significantly reduced.

In an embodiment, the series of openings is located where the dynamic pressure difference between the first surface and the second, opposite surface of the splitter plate is maximal.

Figure 2:
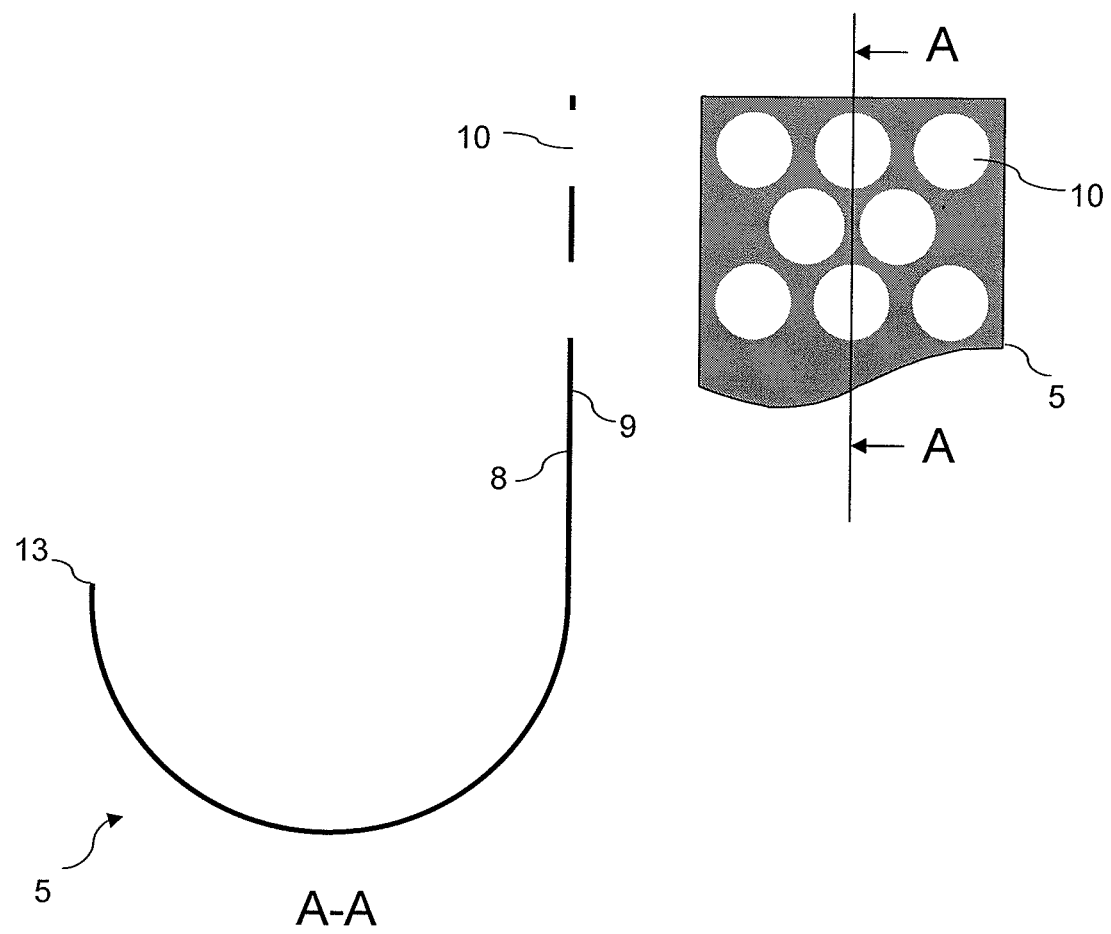
FIG. 2 shows an exemplary embodiment of a flow splitter plate according to the invention, both in a cross-sectional view and a plan view.

FIG. 2 shows an exemplary embodiment of a flow splitter plate 5 according to the invention comprising at least one opening 10 connecting the first surface 8 and the second, opposite surface 9. Actually, the openings connect the two volute regions of the turbo machine. It will be understood that the flow splitter plate of the present invention is designed to replace the flow splitter plate of the prior art. It is further understood that a perforated region as shown in the plan view can be attached to the tail edge 15 of an existing flow splitter plate of the prior art. It is understood that not all the openings of the perforated area necessarily have the same dimensions or shape.

In some embodiments and under certain conditions, periodic vortex shedding at the openings 10 might lead to the generation of pulsations if the vortex shedding frequency is close to the frequency of acoustic pressure fluctuations. In that case, the acoustic pressure fluctuations trigger vortex shedding and the vortex shedding will, in its turn, amplify the acoustic pressure fluctuations. The vortex shedding frequency can be calculated by the Strouhal number $St=f \cdot D/v$ (f=vortex shedding frequency, D a characteristic dimension of the opening (for instance the diameter), and v a characteristic flow velocity), which also depends on the geometry of the openings. For perforations, a typical value for St is 0.24 to 0.30. In order to avoid tonal noise generation at the openings, the size of the individual openings (i.e. the diameter if the openings are round) in the flow splitter plate has to be chosen such that the vortex frequency is sufficiently higher than the frequency of the source of the pulsations at the volute tongue, i.e. the blade passing frequency. The blade passing frequency is defined as the rotation speed times the number of impeller blades or vanes. As a design rule the diameter of the openings can be selected such that the vortex frequency is at least two times the blade passing frequency. For a medium with vibration frequency (sound) of 100 Hz and a flow velocity of 5 m/s the openings should be smaller than 2.5 mm.

The total area of the openings should be approximately the same as the cross-sectional flow area between the flow splitter plate and the interior of the casing at one side of the flow splitter plate in order to have sufficiently low acoustic impedance between both channels created by the flow splitter plate. In an embodiment, the total area of the series of openings in the flow splitter plate is between one third and two third of the pump discharge cross section.

Model calculations by a simulation tool have shown that the length of the perforated part should be more than 10% of the wavelength of the pulsations and preferably be at least a quarter of the wavelength of the pulsations, whereas a length of more than half a wavelength appears to be less effective.

By using a specific design of the path between the volute tongues it is possible to prevent the excitation of resonances by the pulsations generated by the interaction between impeller blades and volute tongues. In a centrifugal pump the length of the flow splitter plate has to be of the proper length.

A serrated edge at the downstream side of the flow splitter dampens the resonances and in addition prevents coherent vortex shedding which can be a secondary source of pulsations. One of the parameters that determine the resonance frequency, is the length of the flow splitter plate. If it is observed that resonances occur during pumping of a certain medium under certain conditions, one can reduce or increase the length of the flow splitter plate to avoid resonance in such a specific operation window.

In case of a pump or compressor with a diffuser comprising vanes, a similar technique can be applied. The length of the vanes should be tuned such that a resonance condition between the pulsation source at the leading edge of the diffuser vanes is avoided. The leading edges of the vanes act similar to a volute tongue in a centrifugal pump.

Perforations at the trailing edge of the vanes, similar to those in the flow splitter plate, will provide acoustical damping.

Figure 3A:
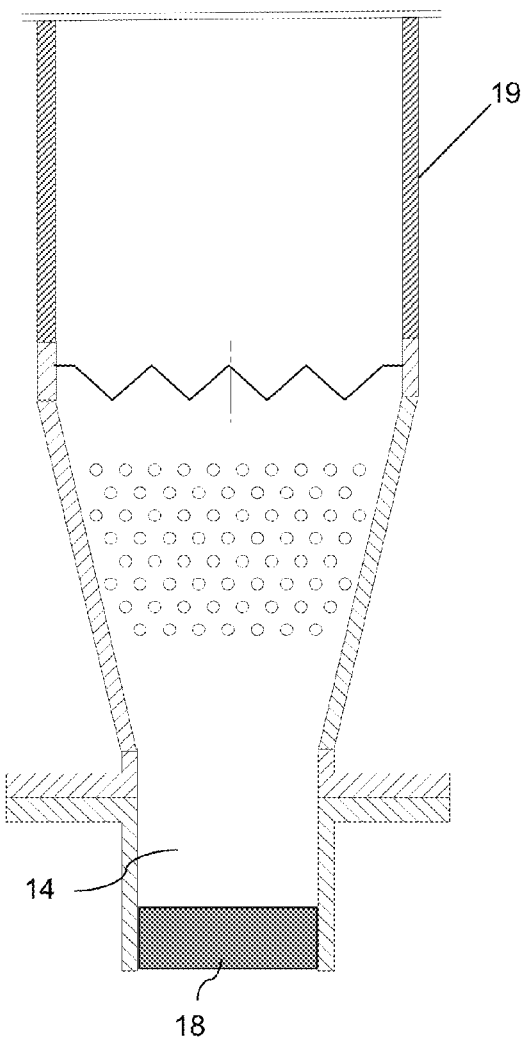
FIG. 3 shows a preferred embodiment of a flow splitter plate according to the invention

FIG. 3A shows a preferred embodiment of a flow splitter plate according to the invention comprising a perforated area 16 and a serrated tail edge 15 with an indentation that is half the distance between the teeth of the serrated edge. This specific flow splitter plate was designed and has been successfully applied in a propane pump. The pump, a single stage, double volute pump with a 7 blade impeller running at 3000 rpm with a flow splitter plate without perforations, showed an internal resonance exited by the interaction of the impeller blades with a volute tongue. This caused pulsations at a blade passing frequency (BPF) of 350 Hz, and its multiples. FIG. 3A also shows a part of a pipe system 19 that is connected to a downstream outlet end of the pump 18.

Figure 3B:
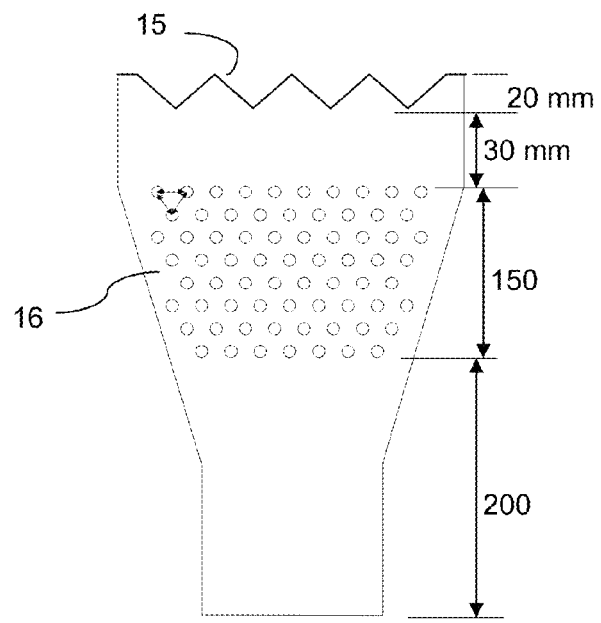

The existing flow splitter plate of the pump 18 was extended with the plate according to the invention as shown in FIG. 3B. In an embodiment, the openings of the series of openings in the perforated area includes openings having a diameter between 5 and 15 mm. The distance between the centre of the openings is preferably between 1.5 and 3 times of the diameter of the openings. In the example of FIG. 3A, the extension of the flow splitter plate contains 100 openings with a diameter of 10 mm at a mutual distance of 20 mm.

By means of an acoustic model of the pump and calculated source amplitudes it is shown that the resulting pulsation amplitudes in the discharge piping could be reduced from 3 bar peak to peak to 0.3 bar peak to peak.

It is understood that the openings will in general be round but might also have any other appropriate form such as for example an ellipse, a pentagon, or a triangle. It is understood that there might be two or more perforated sections.

It will be understood by those skilled in the art that the present invention is not limited to the embodiments illustrated above and that many modifications and additions may be made without departing from the scope of the invention as defined in the appending claims. In particular it is understood that the present invention includes the use of more than one flow splitter plate. It is further in particular understood that the invention can be applied not only in centrifugal pumps but also in other types of pumps and compressors where pressure drop can occur across structural parts.

The invention claimed is:

1. A turbo machine comprising:
  a casing defining a first volute tongue,
  an impeller with at least one vane, and
  a flow splitter plate defining a second volute tongue at an upstream end of the flow splitter plate for splitting a flow of a fluidic medium produced by the impeller, the flow splitter plate extending in a splitter plane that is situated essentially parallel to the direction of the flow, the flow splitter plate having a first surface and a second, opposite surface, wherein the flow splitter plate includes a series openings forming a perforated area and each opening extending through the flow splitter plate from the first surface to the second opposite surface, wherein the perforated area is positioned adjacent a downstream end of the flow splitter plate.

2. A turbo machine according to claim 1, wherein the at least one opening is located where the dynamic pressure difference between the first surface and the second, opposite surface is maximal.

3. A turbo machine according to claim 1, wherein the perforated area with the series of openings extends over a length in parallel with the flow direction, which length is between 10% and 50% of a wavelength of a vibration for the same turbo machine without a series of opening forming the perforated area.

4. A turbo machine according to claim 3, wherein the perforated area with the series of openings extends over a length in parallel with the flow direction, which length is substantially a quarter of a wavelength of a pulsation for the same turbo machine without a series of openings forming the perforated area.

5. A turbo machine according to claim 1, wherein the total area of the openings of the perforated area in the flow splitter plate is between one third and two third of the pump discharge cross section.

6. A turbo machine according to claim 5, wherein the total area of the openings of the perforated area in the flow splitter plate is substantially one half of the pump discharge cross section.

7. A turbo machine according to claim 1, wherein the characteristic dimension of each opening is chosen in such a way that a vortex shedding frequency in each opening is at least two times a frequency of an acoustic source defined by the rotation speed of the impeller times the number of impeller vanes.

8. A turbo machine according to claim 7, wherein the openings in the perforated area have a diameter between 5 and 15 mm.

9. A turbo machine according to claim 8 wherein the distance between the center of the openings is between 1.5 and 3 times of the diameter of the openings.

10. A turbo machine according to claim 1, wherein the at least one opening extends to a tail edge of the splitter plate.

11. A turbo machine according to claim 1, comprising openings of different sizes.

12. A turbo machine according to claim 1, wherein the shortest distance between the second volute tongue of the flow splitter plate and each point of the tail edge of the splitter plate is not uniform.

13. A turbo machine according to claim 12, wherein the tail edge has an indentation that is at least as large as the size of the vortices shedding from the tail edge.

14. A pipe system comprising a pump or compressor wherein the pump or compressor is a turbo machine according to claim 1.

* * * * *